June 17, 1930. N. STEFANIDE 1,765,290
REFRIGERATOR ATTACHMENT
Filed Sept. 8, 1928

Inventor
Nick Stefanide
By Watson E. Coleman
Attorney

Patented June 17, 1930

1,765,290

UNITED STATES PATENT OFFICE

NICK STEFANIDE, OF LINWOOD, PENNSYLVANIA, ASSIGNOR OF ONE-HALF TO THEODORE CHRISTY, OF LINWOOD, PENNSYLVANIA

REFRIGERATOR ATTACHMENT

Application filed September 8, 1928. Serial No. 304,715.

This invention relates to a refrigerator attachment and has relation more particularly to an attachment especially designed and adapted for use in connection with a refrigerating cabinet for ice cream and the like, and it is an object of the invention to provide an attachment which, when in applied or working position, serves effectually to insulate the upper portion of the container for the ice cream or the like to eliminate freezing within the upper portion of such container.

It is well known in the trade that freezing within the upper portion of a container for ice cream results in the formation of ice particles which, in the serving of the contents of the container, becomes mixed with such contents and thereby materially reduces the quality. An object of the invention is to eliminate this disadvantage.

Another object of the invention is to provide means operating to prevent water or the like dripping through the opening in the top of the cabinet into the container for the ice cream or the like.

The invention consists in the details of construction and in the combination and arrangement of the several parts of my improved refrigerator attachment whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1:
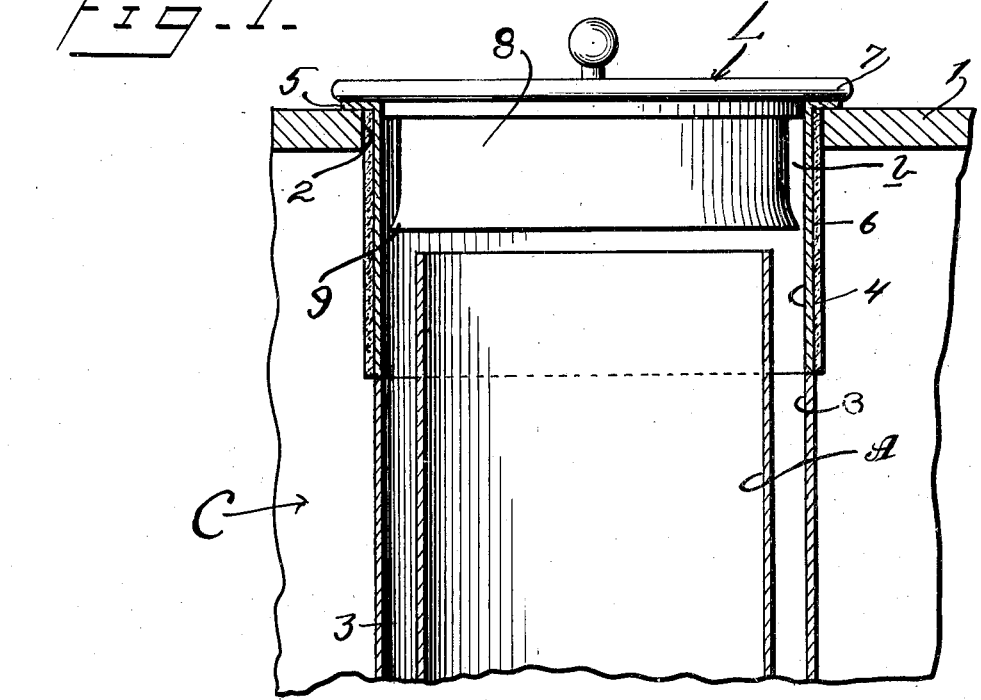
Figure 1 is a fragmentary view partly in vertical section and partly in elevation illustrating an attachment constructed in accordance with an embodiment of my invention.
Figure 1:
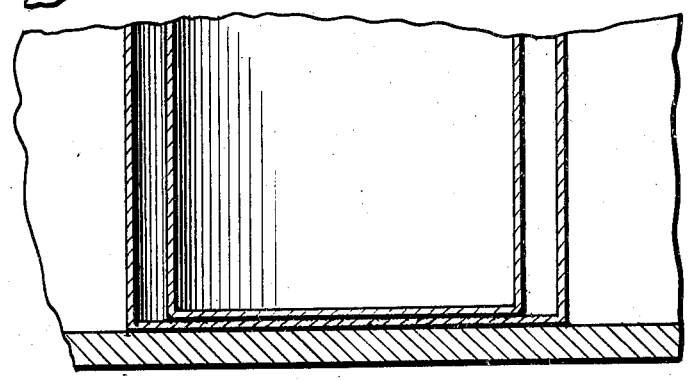
Figure 2:
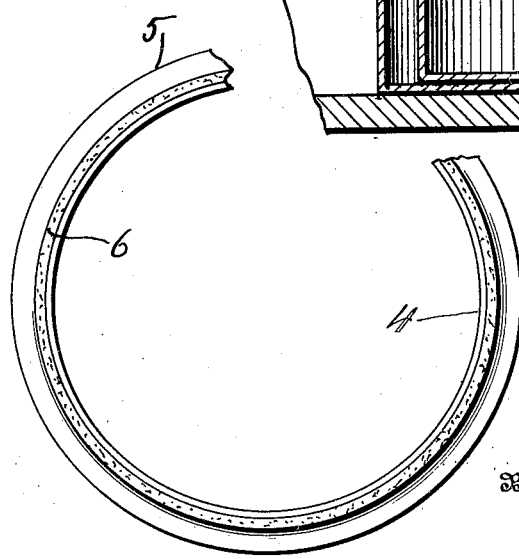
Figure 2 is a horizontal sectional view, with a portion broken away taken through my improved attachment unapplied.

As disclosed in the accompanying drawing, C denotes a portion of a cabinet of a type now generally in use in connection with ice cream or the like in bulk and wherein the top wall 1 is provided with an opening 2 to permit the proper application or removal of a container A. The container A is intended to initially hold a supply of ice cream or the like to be dispensed and when within the cabinet C is loosely engaged within a vertically disposed receptacle 3 of desired dimensions and open at its top with its open upper end spaced a material distance from the top 1 of the cabinet C. The container A is maintained in desired position below the opening 2 in any desired manner. The applied container A is also preferably of such dimensions as to have its upper end terminate above the upper end of the receptacle 3 when the container A is positioned within the receptacle 3.

My improved attachment comprises a sleeve or member 4 of desired length and which has its outer end defined by an outstanding flange 5 which, when the attachment is in applied position, engages from above that portion of the top 1 of the cabinet C defining the opening 2 whereby the attachment is effectively maintained in working position.

The outer face of the member 4 has disposed thereover, a lamination 6 of a material, such as leather, to effectively insulate or protect the upper portion of the applied container A against extreme cold so that the formation of ice within the upper portion of the applied container A is prevented. It is to be noted that the member 4 is of a length to have its lower or inserted end substantially in contact with the upper end of the receptacle 3 when the member 4 is in applied position and constituting a continuation of the receptacle 3.

The member 4 has coacting directly therewith a cover or lid L for the opening 2. This lid L has an upper marginal flange 7 which contacts from above with the flange 5 of the member 4 while the body portion 8, which extends within the tubular member 4, is of a diameter less than the internal diameter of the member 4 to provide a space $b$. The body member 8 of the lid L is of a diameter in excess of the upper open end of the applied container A and the lower portion of said body is outwardly flared, as at 9, to provide a shed to throw water or the like which may enter within the member 4 toward such member and beyond the periphery of the container A. This serves to maintain the contents of the container A in a sanitary condition and also permits moisture to enter between the applied container A and the receptacle 3 and freeze therebetween to further increase the desired refrigeration.

From the foregoing description it is thought to be obvious that a refrigerator attachment constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a refrigerating cabinet having an opening in its top wall, a receptacle positioned below said opening and having its upper end spaced below the top wall of the cabinet, a container freely placed within the receptacle, said container when arranged within the receptacle having its upper portion extending above the upper portion of the receptacle, an insulating attachment comprising a tubular member insertible through the opening in the top wall of the cabinet and of such length as to extend below the upper portion of the container.

2. In combination with a refrigerating cabinet having an opening in its top wall, a receptacle positioned below said opening and having its upper end spaced below the top wall of the cabinet, a container freely placed within the receptacle, said container when arranged within the receptacle having its upper portion extending above the upper portion of the receptacle, an insulating attachment comprising a tubular member insertible through the opening in the top wall of the cabinet and extending from said top wall of the cabinet below the upper portion of the container.

3. In combination with a refrigerating cabinet having an opening in its top wall, a receptacle positioned below said opening and adapted to receive a container, an insulating attachment comprising a tubular member insertible through the opening in the top wall of the cabinet and of sufficient length to reach from said top wall of the cabinet to a point considerably below the upper portion of the container, and a cover for the opening extending within the tubular member, the portion of the cover within the tubular member being of a diameter less than that of the tubular member but of a diameter in excess of the upper end of the container, the lower part of the portion of the cover entering the tubular member being outwardly flared to provide a water shed.

4. In combination with a refrigerating cabinet having an opening in its top wall, a receptacle positioned below said opening, a container within the receptacle, a tubular insulating member carried on one surface of said receptacle and extending from the top of said receptacle down below the top of said container.

5. In combination with a refrigerating cabinet, a box-like enclosure having an opening on its top side, a receptacle inserted through the opening, a container in the receptacle, and a tubular member of insulating material carried by the upper part of said receptacle and extending down below the top of said container.

In testimony whereof I hereunto affix my signature.

NICK STEFANIDE.